Nov. 19, 1968     C. B. WOLF     3,412,274

MOVABLE ELECTRODE FOR ARC HEATER

Filed Jan. 4, 1966     4 Sheets-Sheet 1

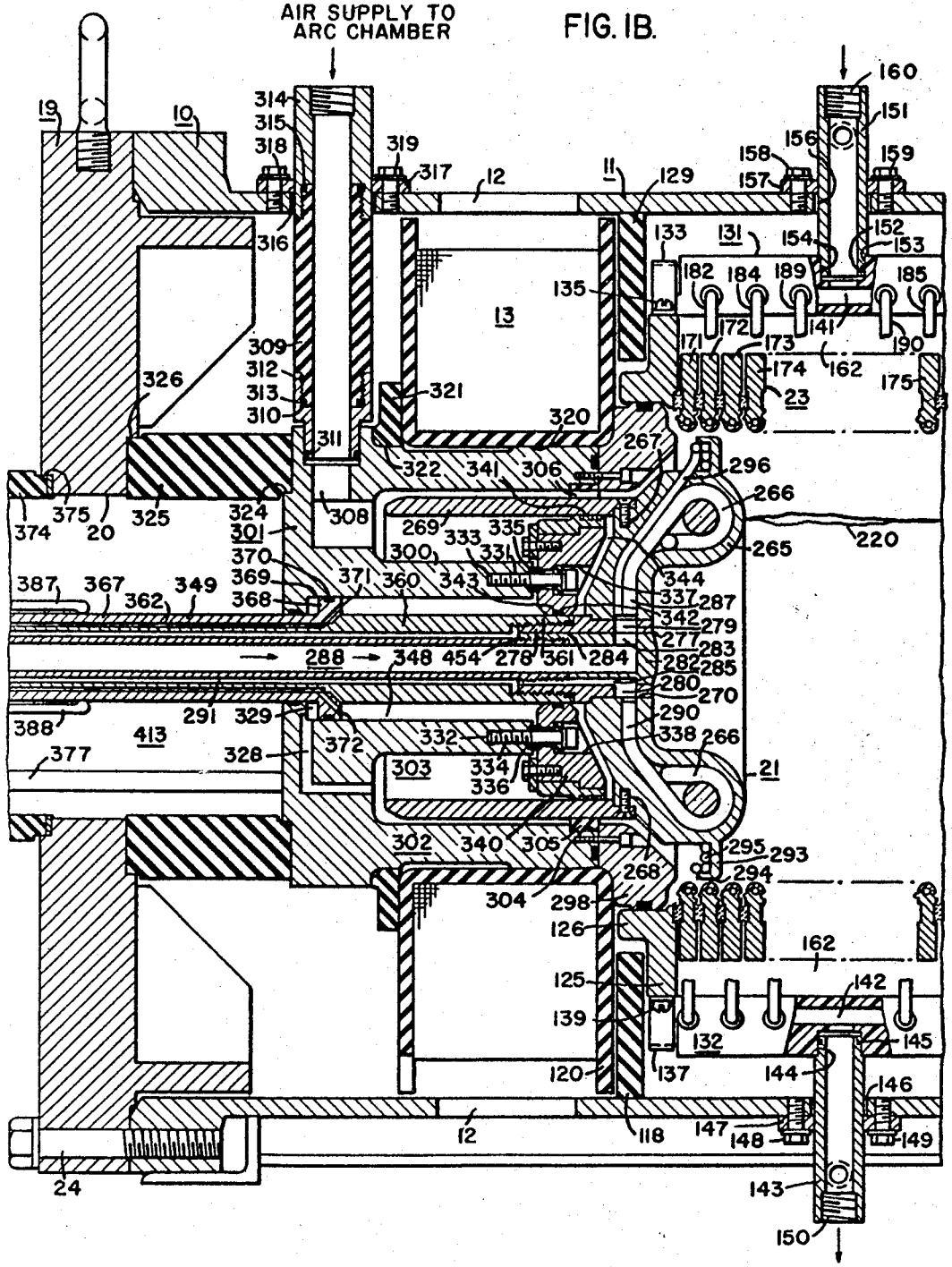

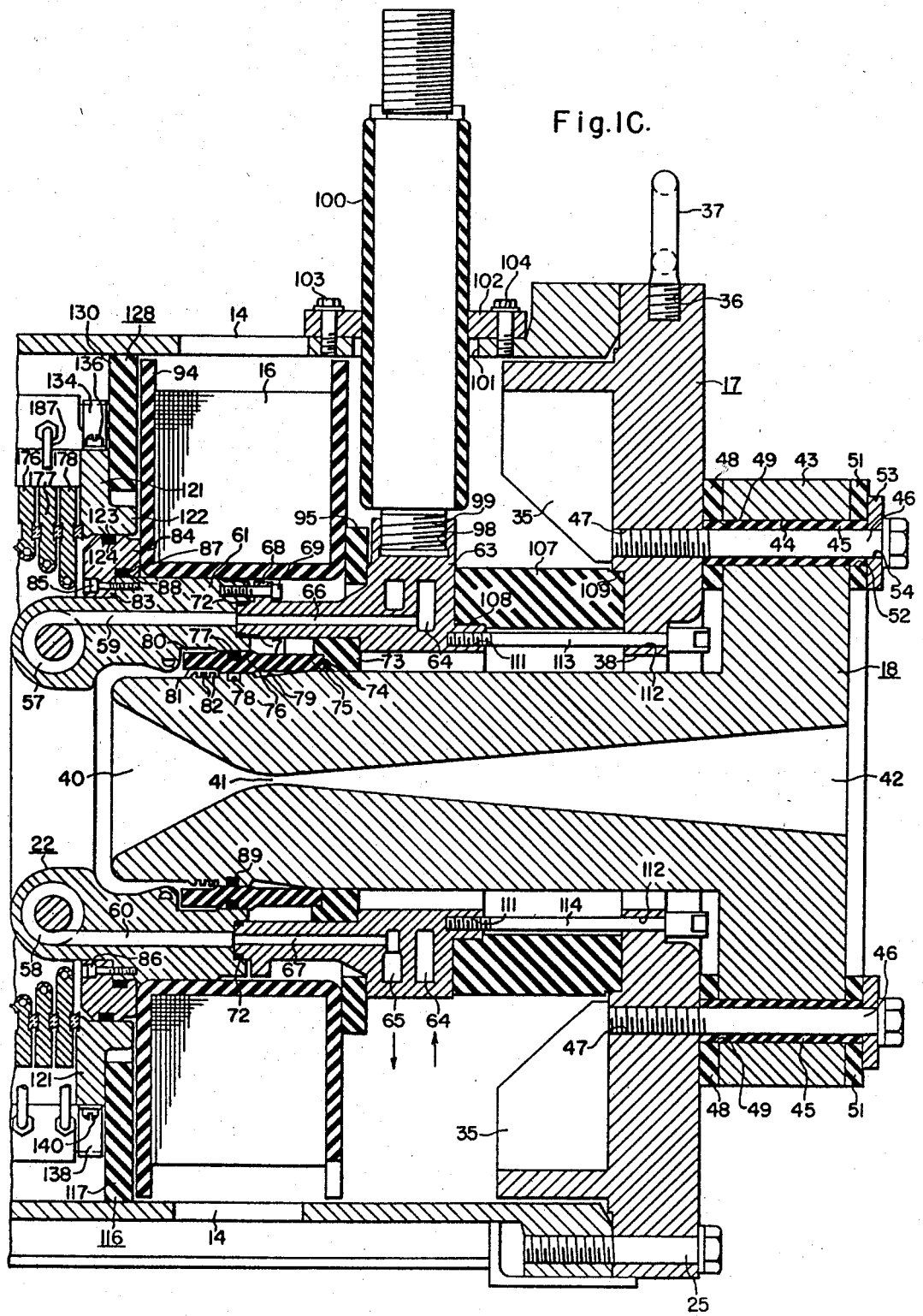

United States Patent Office 3,412,274
Patented Nov. 19, 1968

3,412,274
MOVABLE ELECTRODE FOR ARC HEATER
Charles B. Wolf, Irwin, Pa., assignor to Westinghouse Electric Corporation, Pittsburgh, Pa., a corporation of Pennsylvania
Filed Jan. 4, 1966, Ser. No. 518,596
12 Claims. (Cl. 313—32)

ABSTRACT OF THE DISCLOSURE

A movable fluid cooled electrode suitable for use in a gas arc heater has means forming an annular arcing surface with fluid flow passageways therein for conducting heat flux from the arcing surface. A plurality of coaxial tube arrangements bring fluid to and from, and current to the electrode to produce the arc, while maintaining the electrode insulated from the supporting structure to prevent the formation of parallel current paths which might cause sparking. One tube brings cooling fluid to the electrode, the fluid also exerting a force on the electrode tending to move it from an operating position to a contact position adjacent a stationary electrode to start the arc. A substantially cylindrical air space back of the electrode operating position cooperates with a cylindrical member carried by the movable electrode to equalize the pressures on the back and front (arcing surface) of the electrode to make movement of the electrode relatively uninfluenced by gas pressure in the arc chamber. In one embodiment, air trapped in an air space slowly exits thereby limiting the forward rate of movement of the electrode. An air-actuated piston attached to one of the coaxial tubes is employed to move the electrode back to operating position. Means provides a fluid trap operative upon backward movement of the electrode, which fluid is slowly forced through, in one embodiment, a very narrow annular passageway, thereby limiting the rate of movement of the electrode. In another embodiment on the backward movement of the electrode, outlet fluid from the electrode is trapped and discharged through axially and peripherally spaced bores in a tube which continually decrease in number as the electrode and tube move toward the operating position thereby providing a shock absorber effect.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to improvements in electrodes for arc heaters, and more particularly to an improved movable electrode which may be moved to make contact with another electrode to start the arc and thereafter be moved back to an operating position.

The most commonly used devices for starting an arc in an arc heater prior to my invention, were to insert a fuse wire between electrodes, which had the disadvantage of leaving waste material in the chamber which sometimes required dismantling after using the chamber, or to provide a device which was electrically connected to one electrode and moved up to the other electrode to make contact therewith and start the arc, whereafter the device was moved back and the arc ultimately transferred to the electrode. These latter devices were commonly referred to as arc drawing mechanisms. One such device is shown in Patent No. 3,078,383, issued Feb. 19, 1963 to H. J. Lingal for "Arc Chamber."

The Lingal device, however, has the disadvantage of requiring complicated mechanical structure to operate the arc drawing mechanism.

I have overcome the disadvantages of the prior art by using the same fluid under pressure which cools the electrode to move the electrode to contact position and start the arc, and thereafter I employ air under pressure, working on a piston operatively attached to the electrode, to move the electrode back to an operating position.

In summary, I provide an electrode having a long tube attached thereto for bringing cooling fluid to the electrode, the tube being in sliding engagement with a concentrically mounted tube fed from a fluid inlet. My piston is secured to an additional tube secured to the electrode, concentric with the other tubes but spaced therefrom, and forming an annular or cylindrical fluid passageway for the flow of fluid from the electrode to a fluid outlet. The last-named tube also brings current to the electrode to sustain the arc, the electrical circuit being completed by way of contact fingers in sliding contact with the last-named tube.

Accordingly, an object of my invention is to provide a new and improved movable electrode for an arc heater.

Another object is to provide a new and improved movable electrode in which the same fluid which cools the electrode is used to move it.

Figure 1A:
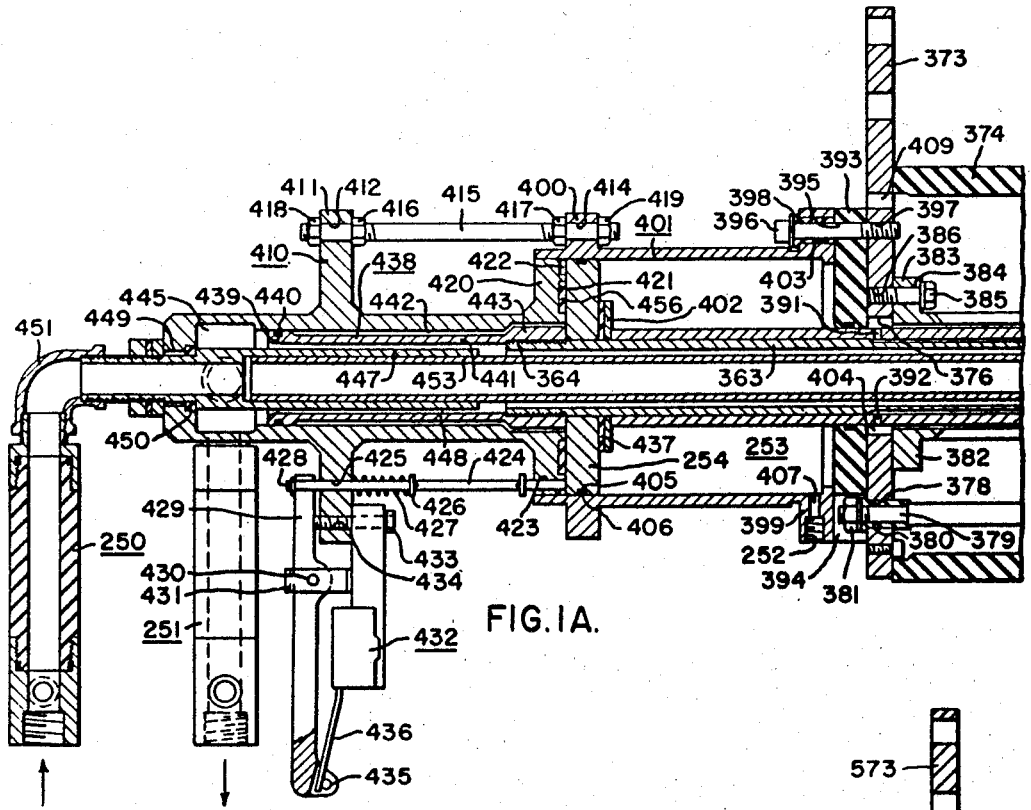
Figure 2A:
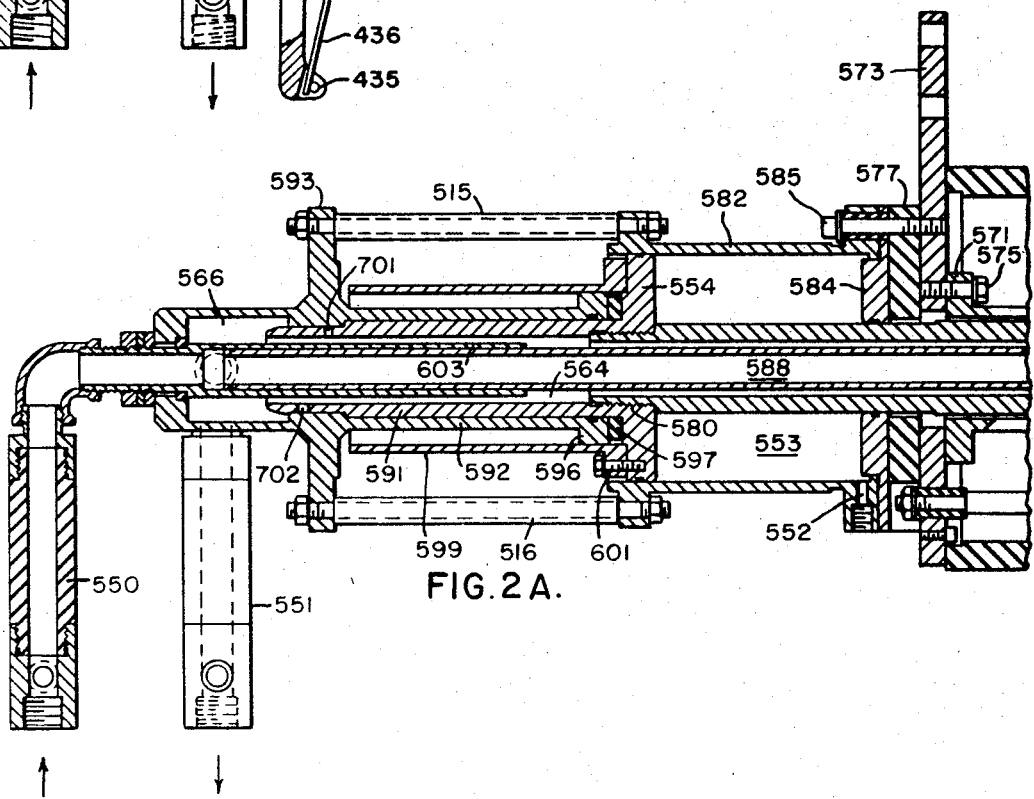
Figure 2B:
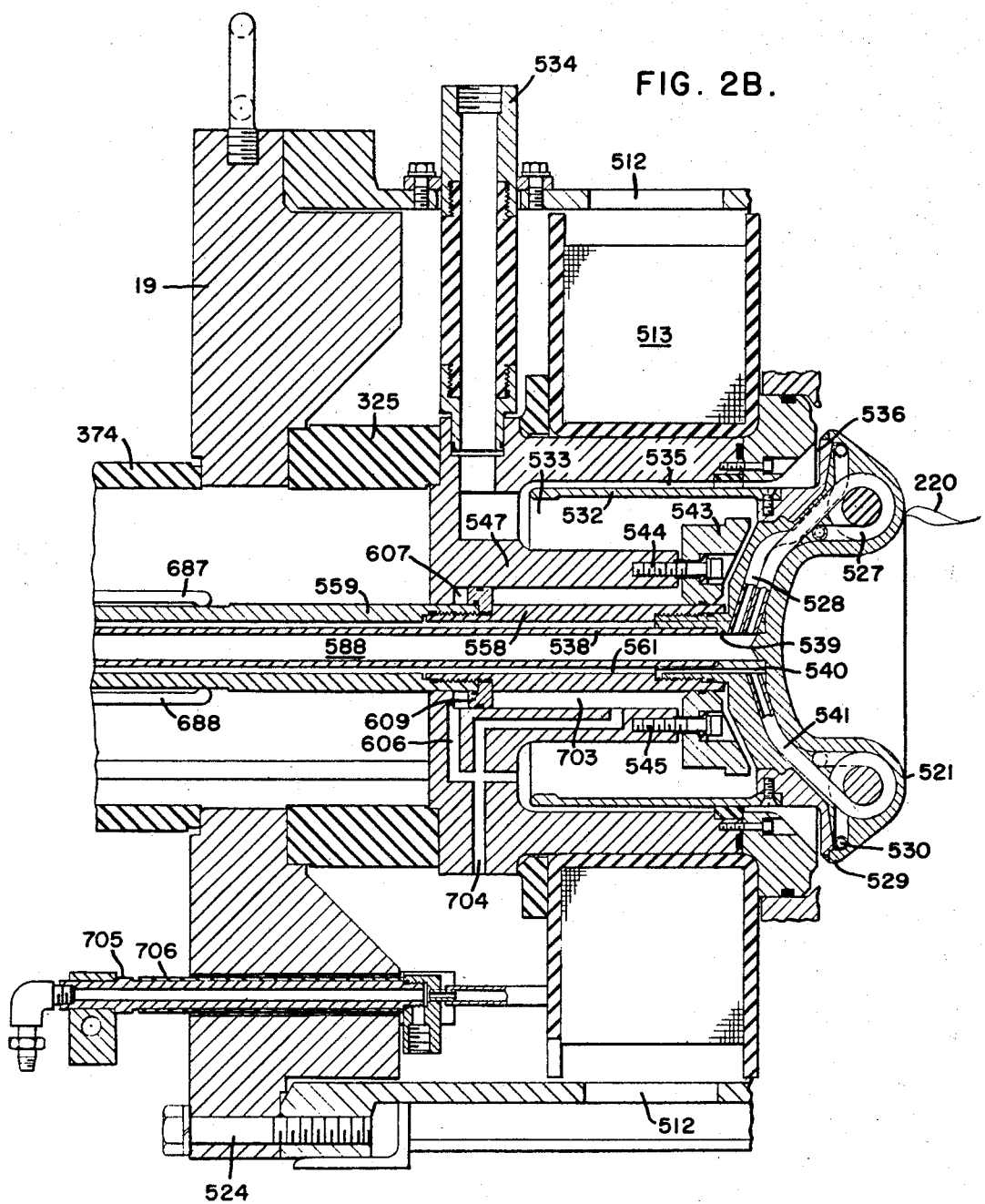

These and other objects will become more clearly apparent after a study of the specification and the accompanying drawings, in which:

FIGURES 1A, 1B and 1C taken together show a cross-sectional view through apparatus according to one embodiment of my invention, as used in an arc heater; and FIGS. 2A and 2B taken together show a second embodiment of my invention.

The arc heater itself of FIGS. 1A–1C inclusive is the invention of Thomas E. Browne, Jr., and Charles B. Wolf, as described and claimed in a copending patent application for "Arc Heater Apparatus and Heat Shield Assembly for Use Therein," Ser. No. 340,221, filed Jan. 27, 1964.

Referring now to the drawings, in which like reference characters are used throughout to designate like parts, and in particular to FIG. 1 thereof, the apparatus is seen to include, in broad outline, a tank assembly generally designated 10 having a cylindrical wall portion 11 with spaced openings 12 around the periphery thereof at selected positions therein on one side of the arc chamber to provide for ventilation of a field coil 13 adjacent thereto, and tank 10 has an additional series of spaced apertures 14 on the other side of the arc chamber 15 for ventilating field coil 16 disposed adjacent thereto. The tank assembly includes a generally annular end cover 17 for the front or downstream end of the chamber, that is, the nozzle end, the cover 17 having disposed therein a nozzle generally designated 18 which is electrically insulated therefrom in a manner and for purposes hereinafter to be made more clearly apparent. At the other or rear end of the tank assembly there is a somewhat similar cover plate 19 having aperture 20 therein through which passes the supporting structure of a movable rear electrode generally designated 21, the electrode 21 being adapted to be moved to the right, FIG. 1, until it makes contact with the front electrode generally designated 22, for the purpose of starting the arc. Thereafter the rear electrode 21 is returned to the position shown in the drawing by means hereinafter to be described.

The wall of the arc chamber is made up of a series of stacked metallic rings separated from each other by washers so that the rings are electrically insulated from each other, the stacked ring assembly being generally designated 23. In a manner hereinafter to be described in greater detail, each of the rings comprising the ring assembly 23 is water cooled by circulating water in a circular passageway therein.

At the rear end a plurality of spaced bolts 24 around the periphery of cover 19 clamp the cover 19 to the flange portion of cylindrical wall or tank 11, and at the front end a plurality of bolts 25 at spaced intervals around the periphery of front cover 17 clamp the front cover to an adjacent flange portion of the cylindrical wall or tank 11.

In more detail, the front end cover plate 17 has a series of spaced radially extending flanges at spaced intervals around the periphery thereof on the inside surface thereof to provide mechanical reinforcement of the cover plate, these flanges being designated 35. On the upper side of the cover plate 17 as seen in FIG. 1, there is a threaded bore 36 in which is disposed an eye or ring 37 to assist in mounting or lifting of the structure. The front cover 17 has a substantially circular aperture 38 therein through which passes, but spaced therefrom, the aforementioned nozzle 18. The nozzle 18 has the inner passageway portion 40 tapering to form the throat 41 from which point the nozzle passageway generally increases in diameter in the flaring portion 42. The nozzle terminates at its outer portion in a flange portion 43 formed integrally with the inner portion, the flange portion 43 having a plurality of spaced bores 44 therethrough, each of which has a sleeve of insulating material 45 disposed therein through which passes a bolt 46 having the end in threaded engagement in an aligned threaded bore 47 in the cover plate 17. The flange 43 is spaced from and insulated from the cover 17 by an annular ring 48 composed of insulating material, the annular insulating ring 48 having a plurality of bores 49 therein at spaced intervals therearound for the passage of the aforementioned insulating sleeves 45. On the outside of the aforementioned flange 43 there is an additional annular insulating ring 51 having spaced bores 52 therein for the passage of the aforementioned insulating sleeve 45. An additional annular ring 53 composed of metallic material is provided adjacent the insulating ring 51, the annular ring 53 having bores 54 therein of the diameter of the bolt 46 for the passage of the bolts therethrough. The rings 48 and 51 with the sleeves 45 completely insulate the outer flange portion of the nozzle 18 from the end plate 17 while the metallic rings 53 assist the bolts 46 in firmly clamping the flange 43 to the cover 17.

The front or downstream electrode generally designated 22 is preferably composed of a high heat conductivity material such as copper, and has a spiral passageway or spiral passageways extending therearound for the passage of water for cooling the electrode. Two of these passageways are shown at 57 and 58, and it is seen that these spiral passageways have conduit portions 59 and 60 extending through the cylindrical body of the electrode in a direction substantially parallel to the longitudinal axis thereof, the cylindrical body portion being designated 61. The electrode 22 including the body portion 61 may be entirely made of copper to facilitate the transfer of heat energy from the arc chamber. Adjacent the electrode body portion 61 and forming part of the downstream electrode assembly is a front electrode manifold assembly generally designated 63. This manifold assembly is composed of metal and forms part of the electrical circuit to the electrode 22, in a manner which will become more clearly apparent hereinafter. The manifold 63 is seen to have two annular passageways 64 and 65 extending therearound, passageway 64 being a water inlet passageway for example and passageway 65 being a water outlet passageway. It will be understood that these two passageways, which are manifolds, communicate at convenient locations, not shown, with water input and water output couplings, such as hoses, disposed at convenient positions around the outside of the casing generally designated 11. The circular or annular passageway 64 has a plurality of conduits 66 extending therefrom in alignment with the aforementioned conduits 59 in the cylindrical copper portion 61 of the electrode assembly, so that water flows from the manifold passageway 64 through conduits 66 and 59 into the spiral cooling conduit portion 57.

The heated water from spiral passageway 58 travels down the exit conduit 60, which is in alignment with a conduit portion 67 communicating with the outlet annular passageway 65 of the manifold assembly 63. As will be readily understood, a plurality of inlet conduits 66 at spaced intervals around the periphery of the manifold 63 are provided and a plurality of outlet conduits 67 at spaced intervals around the periphery of the manifold 63 are provided, so that a substantial quantity of water is forced through the electrode 22 in a very brief interval of time. The manifold 63 is shown to have an annular flange 63 extending therearound near the copper electrode portion 61, and to have bolts 69 at spaced intervals around the flange 68 making threaded engagement with aligned threaded bores in the cylindrical wall portion 61 of the electrode to firmly attach the manifold 63 to the electrode 22. Annular O-ring seals 71 and 72 are provided at the annular interface of electrode 22 and water manifold 63. Metallic contact of these interfaces prevent or minimize flow of cooling liquid between the inlet and outlet passages at this interface.

The manifold 63 is spaced from the aforementioned nozzle 18 by an annular ring 73 which is composed of both heat insulating and electrically insulating material of a suitable choice. The ring 73 is shown to have an annular cutaway groove portion 74 in which is disposed one end of a ring-like or cylindrical member 75 composed of insulating material, which extends from the ring 73 toward the arc chamber 15 and spaces the adjacent portion of the nozzle 18 from the cylindrical portion 61 of the electrode 22 while electrically insulating the electrode from the nozzle. The ring 75 is seen to have an annular groove 76 therearound for O-ring 77 to form sealing engagement with the inner wall of the electrode portion 61. The nozzle 18 is seen to have an annular groove 78 therearound for containing the O-ring 89, and the nozzle 18 is also seen to have a slightly tapered cutaway annular portion 79 extending therearound to provide a space between the wall of the nozzle 18 and the adjacent wall of ring member 75. It is seen that at the left-hand end of the insulating ring 75, as seen in FIG. 1C, an annular space 80 is provided between member 75 and the inner wall of cylindrical electrode portion 61, and an annular space 81 is provided between the inner wall of cylindrical electrode portion 61, and an annular space 81 is provided between the inner wall of ring member 75 and the adjacent wall of nozzle 18. This wall portion of nozzle 18 is seen to have annular ridges 82 at spaced intervals therealong. If desired, cold air may be introduced into these annular spaces, the air flowing out between the inner wall of the electrode 61 and the adjacent wall of the nozzle 18, and thence flowing into area 40 and thence out of the exhaust end of the nozzle. The flow of air through the aforedescribed channel will keep hot gases from coming in contact with insulator 75 and additionally assist in cooling the nozzle.

The left-hand end of cylindrical electrode portion 61 is seen, FIG. 1, to have a portion thereof forming a shoulder 83 upon which is mounted an annular ring 84, the ring 84 being held in position by a plurality of spaced bolts at intervals around the periphery thereof, two of these bolts being shown at 85 and 86. An O-ring seal 87 in an annular groove 88 provides for a good seal between the ring 84 and the electrode portion 61. The ring 84 is provided as one portion of the support for a stacked plurality of metal rings and gaskets which together form the wall of the arc chamber in a manner hereinbefore set forth. This stack of rings and gaskets is generally designated 23.

Disposed adjacent the electrode portion 61 and the manifold 63 and external thereto is a large field coil 16 enclosed within a housing 94 composed of insulating material. One side of the housing 94 is seen to firmly abut against one side wall of the aforementioned ring 84, whereas the other side of the housing 94 abuts against an annular ring 95 composed of insulating material which spaces the housing 94 from the manifold 63.

The manifold 63 is seen to have a threaded aperture 98 therein at a convenient position, in which is disposed in threaded engagement the threaded end of a power cable connection 99. The cable 99 has an electrical bushing 100 therefor passing through an aperture 101 in the wall 11 of the tank portion, and the bushing 100 is retained in position by the collar 102 having bolts at spaced intervals around the periphery thereof, two of these bolts being shown at 103 and 104 in threaded engagement with aligned threaded bores in the wall of the tank.

The aforementioned manifold 63 is shown to be firmly secured to and spaced from the end cover 17 by a substantial ring member 107 composed of insulating material. The ring member 107 fits snugly in a shoulder 108 formed in the manifold 63, and fits snugly in a shoulder 109 formed in the inner surface of the cover plate 17. The generally cylindrical manifold 63 has a plurality of bores 111 at spaced intervals around the periphery thereof near the inner wall thereof, these bores 111 being in alignment with a plurality of bores 112 at spaced intervals around the periphery of the aforementioned opening 38 in the cover 17. Through these apertures pass a plurality of bolts composed of insulating material or otherwise insulated, two of these bolts being shown at 113 and 114, and which have the threaded ends thereof in threaded engagement in the threaded bores 111.

Means, not shown for convenience of illustration, is provided for bringing an energizing potential to the field coil 16, which is desired is so wound or has the polarity of the potential applied thereto so chosen that the magnetic field of coil 16 opposes the magnetic field of the aforementioned field coil 13 with the result that in the arc chamber a magnetic field substantially transverse to the arc path is provided, for reasons which will become hereinafter more clearly apparent.

The field coil 13 may be connected in series or in parallel with coil 16 internally of the tank 11 for excitation, or if desired the field coil 13 may have separate leads to the outside of the tank and the desired connections made externally.

As previously stated, the wall of the arc chamber consists of a plurality of stacked annular rings insulated from each other, the rings having a copper portion forming the inside thereof and a stainless steel or non-magnetic metal portion forming the outside thereof. In the copper portion an annular passageway provides for the flow of a coolant such for example as water to assist in cooling the walls of the chamber. This annular passageway may be entirely in the copper portion, or may be at the border surface between the two portions, and in fact a portion of the passageway may be cut out of the stainless steel or non-magnetic metal portion. In addition, the rings, which are all substantially floating with respect to each other except for the connection through the high resistivity cooling fluid, are insulated from each other so as to inhibit the arc striking to the coolant rings and forming a low resistance electrical path therethrough.

Generally speaking, the cooling ring and gasket assembly and water headers generally designated 131 and 132 are cradled in a pair of saddles which are generally designated 128 and 116 and which include plates 117, 118, 129 and 130, which are composed of insulating material and bolted to the tank wall 11, one saddle portion 117 abutting against the outer wall of the housing 94 for field coil 16, and another saddle portion 118 abutting against the housing 120 for field coil 13. Saddle portions 129 and 130 of saddle 128 for water header 131 likewise abut against housings 120 and 94.

As previously stated, the inner end of the electrode 22 has an annular ring 84 secured thereto, and abutting against the outer surface of this annular ring 84 is the flanged portion 122 of a ring-like supporting member 121; the flange portion 122 is sealed by O-ring 123, the O-ring 123 being disposed in annular groove 124 in ring 84.

On the other side of the ring and gasket assembly, there is a similar ring 125 with a flange portion 126. These rings 121 and 125 assist in supporting at substantially diametric positions, or positions 180 degrees apart, the aforementioned pair of water headers generally designated 131 and 132. The water header 131 has extended end or extended side portions 133 and 134 which are secured as by screws 135 and 136 to the rings 125 and 121 respectively. The oppositely disposed water header generally designated 132 has extended side portions 137 and 138 held as by screws 139 and 140 to the rings 125 and 121 respectively.

The aforementioned water header 131 is composed of insulating material, as is the other water header, and may constitute the inlet water header, and has the chamber 141 thereof connected to a hydraulic insulator 151 composed partially of electrically insulating material. The inner end 152 of the hydraulic insulator 151 is seated in a bore 153 in the wall of the water header 131 and has an O-ring 154 for providing a good seal. The hydraulic insulator 151 passes through a bore 156 in the wall portion or cylindrical tank portion 11, and the hydraulic insulator 151 is held in place therein by a collar 157 having spaced bolts around the periphery thereof, two of these bolts being shown at 158 and 159 in threaded engagement with aligned threaded bores in the wall portion 11. The upper end of the heat shield hydraulic insulator 151 is seen to be threaded at 160 to receive a coupling to, for example, a flexible hose for bringing water to the input water header 131. In the space 162 between the water header 131 and the adjacent outer surfaces of the rings forming the heat shield is a series of insulated bolts (not shown) which join supporting rings 121 and 125 for the purpose of holding the heat shield together as a unit and compressing the sealing gaskets between the heat shield rings.

As previously stated, each of the rings of the ring assembly generally designated 23 has a circular passageway therethrough with inlet and outlet passageways disposed 180 degrees apart for bringing cooling liquid to the inner circular passageway and exiting the fluid from the passageway. The stacked ring heat shield assembly generally designated 23 is seen, in FIG. 1, to include rings 171, 172, 173, 174, 175, 176, 177 and 178, there being room for seven additional rings between ring 174 and ring 175, these seven additional rings being of the same diameter as rings 174 and 175 but not being shown for clarity and simplicity of illustration. The water inlet 131 is seen to have a plurality of conduits extending from the side thereof, these conduits being designated 182, 184, 189, 190, 185 and 187. Conduit 182 is connected to ring 172 to bring water thereto, conduit 184 is connected to ring 174, conduit 185 is connected to ring 175, and conduit 187 is connected to ring 177. It is understood that one the other side of the inlet water header 131, and not visible in FIG. 1, there is an additional group of conduits corresponding to those shown, for bringing cooling water to ring 171, ring 173, ring 176, and ring 178. It is noted that rings 177 and 178 are of reduced inner diameter to reduce the space between the inner side of the heat shield and adjacent portions of the electrode 22. This reduced inner diameter of rings 177 and 178 assists in preventing direct radiation from the arc from reaching the ring member 121 and ring member 84, direct radiation causing the heating and possible destruction of these elements.

The aforementioned outlet water header 132 is seen to have a chamber 142, to have a hydraulic insulator 143 firmly seated in a bore 144 with an O-ring seal 145. The hydraulic insulator 143 passes through an aperture 146 in the wall portion 11 and is held in place by a collar 147 having bolts at spaced intervals around the periphery thereof, two of these bolts being shown at 148 and 149 in threaded engagement with adjacent threaded bores in the wall portion 11. The heat shield hydraulic insulator member 143 has a threaded outer end 150 for making threaded engagement with a coupling hose.

It will be understood that seven additional conduits, not shown, extend from the other side of the water header 132 and connect with passageways in the other rings, these passageways being disposed at a slight angle to the passageways in the rings shown. As previously stated, each of the rings consists of an outer portion of stainless steel or non-magnetic metal and an inner portion of a material which is highly conductive of heat, for example, copper. Each of the rings has an annular groove extending therearound, and on the opposite side of the ring is an annular tongue extending entirely around the ring. The tongue of one ring extends into but does not touch the surface of an aligned groove in the adjacent ring. As previously stated, each ring is electrically insulated from the adjacent rings on both sides thereof. The purpose of the tongue extending into the groove is to shield a spacer washer from direct radiation from the arc 220. The spacer washer between rings is disposed in aligned adjacent grooves in adjacent rings. The spacer washer, which is circular or annular in shape, spaces the rings from each other while insulating the rings electrically from each other. The spacer washer is composed of a material which is both electrically insulating and preferably heat resistant also. It is seen that on the other side of the one ring there is a groove, the annular groove extending all around the wall of the ring, the groove being adjacent a groove in an adjacent ring. A spacer washer is disposed in the aforementioned grooves in adjacent walls of the rings. In all sixteen spacer washers are provided, fourteen of these washers being disposed between the fifteen rings for insulating and pneumatically sealing the space between the rings, and two additional outer washers snugly resting in the shoulders in the aforementioned ring support members 125 and 121 respectively. As previously stated, there is a space 162 between the inner wall of the water header 132 and the adjacent cylindrical outer surfaces of the ring members. The ring members are retained in place in the stack by the pressure of insulated bolts which join members 125 and 121, pressure against the end washers being exerted through the entire stack of rings. To assist in maintaining the rings in position, the diameter of rings 298 and 84 is made such that sealing between 298 and 125, and sealing between 84 and 121, occurs at a circular position which is slightly larger in diameter than the mean diameter of the end gaskets; pressure on the rings exerted by gas in the chamber 15 tends to tighten the seal.

Water flows through the aforementioned inlet hydraulic insulator 151 into the chamber 141 of the input water header 131, whence it passes by way of conduits to the various rings, some of these conduits being shown at 182, 184, 189, 190, 185 and 187. The water then passes into the circular passageways in each of the rings, and around the dual paths in the passageways, the water exiting from the rings through the exit conduit portions and thence through conduits into the chamber 142 of the exit water header generally designated 132, and thence out through the water header hydraulic insulator 143. The copper portions of the ring members provide for the efficient conduction of the heat transmitted thereto by convection and direct radiation to the water and result in an efficiently cooled arc chamber. As previously stated, each of the rings is electrically insulated from the other rings on both sides thereof and this inhibits the arm 220 from inadvertently striking to the rings and forming an electrical passageway between electrodes 21 and 22 at least partially through the rings.

Striking of the arc or formation of arc terminals on the shield element could form heat spots cutting or melting through the metal walls, and releasing the cooling liquid. This is prevented by limiting the electrical potential difference between adjacent elements to a low value, preferably less than 100 volts when maximum arc voltage exists between the terminal electrodes 21 and 22. This is additionally insured by the "potentiometer effect" of the uniform water passages, which form the only electrical connection between the individual rings and the arc terminals. This effect is by virtue of the low but finite conductivity of the cooling water even when it is relatively pure. The number of elements or rings is made greater than the maximum arc voltage divided by a value of the order of 100 volts.

The aforementioned movable electrode generally designated 21 may be called herein the starter electrode since electrode 21 moves to electrode 22 and makes contact therewith for starting the arc. Thereafter electrode 21 is moved away from electrode 22. The moving electrode has a hydraulic insulator generally designated 250 for the fluid input terminal thereof, and a hydraulic insulator generally designated 251 for the exit of cooling water from the cooling conduit. As will be seen hereinafter, the pressure of the water at inlet 250 is sufficient to force the electrode 21 to the right until it makes contact with electrode 22. To restore the electrode 21 to the operative position shown, air is inserted through an opening 252 and passageway 407 into a chamber 253 where it exerts pressure against a piston 254, forcing the piston to the left, and carrying with it the electrode 21, in a manner which will be described in more detail hereinafter. The aforementioned movable electrode generally designated 21 has a dish shaped portion 265 composed of copper or other material having a high heat conductivity, with a spiral passageway 266 extending therearound. The dish portion or electrode portion 265 has mounted thereon and secured thereto by a plurality of screws, two of these screws being shown at 267 and 268, a generally cylindrical back portion 269. The dish portion 265 has a circular bore or aperture 270 substantially centrally disposed therein in which is disposed one end of a coupling member or bushing 277 having a threaded portion 278 at the other end thereof, having a passageway 279 through the wall thereof at a predetermined position on one side thereof and having an additional passageway 280 on the other side thereof, the passageways 279 and 280 not communicating with each other. Inside the bushing 277 and snugly fitting therein is an additional coupling member 282 having an aperture 283 in one side thereof in alignment in the aforementioned aperture 279 in bushing 277 when the coupling member 282 is in position in the bushing. The coupling member 282 is seen to have at the other end thereof a portion of slightly increased inner diameter with threads on the inner surface thereof, this portion being designated 284. The other side of the coupling member 282 opposite to the opening 283 is asymmetrical with respect to the first-named side and has the outer diameter thereof considerably reduced to form a space 285 between the outer wall of member 282 and the inner adjacent wall of member 277, this space 285 extending, for example, one-half way around the bushing 277 and including the portion of the coupling member 282 which is adjacent to the aforementioned opening 280 in the bushing 277. The space 285 communicates with an annular space 291 and provides part of the entire passageway for the flow of water from the spiral conduit of the electrode portion 265 to outlet hydraulic insulator 251. It is seen that the main electrode portion 265 has an inlet conduit portion 287 connecting the spiral portion 266 of the cooling passageway to the aperture 279. Cooling water entering through the aforementioned hydraulic coupling member 250 flows down the long central passageway 288, to be described in further detail later, and it is seen that the passageway 288 communicates through the aforementioned openings 283 and 279 with the conduit portion 287. Cooling water flowing through the opening 283 in coupling member 282 flows through the opening 279 in bushing 277 and thence into the conduit portion 287 which may be formed integrally with the spiral cooling passageway 266. The water flowing into the conduit 287 may divide and flow in two directions through two portions of the spiral conduit 266, each portion covering substantially 180 degrees of the electrode. Water exits from the spiral cooling tube 266 by way of a conduit 290 which has the end thereof closely adjacent the aforementioned opening 280 in the bushing 277. Thence water flows through the space 285 formed by the asymmetrical portion of reduced outer diameter of the coupling member 282 into the aforementioned exit passageway 291 which will be described in greater detail hereinafter. The electrode portion 265 is seen to have an outwardly extending annular flange portion 293 also composed of copper or other heat conductive material, the annular flange portion 293 having a backwardly flaring lip portion 294. Back of the flange portion 293 and supported by the lip portion 294 is a circular "pancake" cooling coil 295 of somewhat smaller diameter than the passageway 266. The upper end of the cooling coil 295 is seen to communicate by conduit portion 296 with the openings 279 and 283; the lower end of the cooling coils 295 also communicates with the opening 280, this communicating portion of the coil 295 not being shown for convenience of illustration, but it will be understood that water entering the cooling coil 295 through the conduit portion 296 exits through the opening 280 into the passageway or space 285 and thence into the exit passageway 291. The flange portion 293 is provided to prevent direct radiation from the arc between electrodes 21 and 22 from reaching the aforementioned rear sealing ring 298. The structure and purpose of the sealing ring 298 will be described in greater detail hereinafter, but it may be stated here that it is desirable to prevent direct radiation from reaching this ring to prevent burning of the metal and possible destruction of the ring.

The aforementioned electrode 21 with its backwardly extending cylindrical portion 269 is mounted for a translational movement with respect to an axially extending cylindrical portion 300 of a rear chamber forming means generally designated 301. Chamber forming means 301, in addition to the axially extending cylindrical portion 300, also has an outer cylindrical portion 302; the rear chamber forming means 301 is composed of metal and is electrically insulated from the tank 11 and end covers in a manner to become clear hereinafter. The space between the cylindrical portion 300 and the cylindrical portion 302 is designated 303, and provides room for the movement of the piston portion 269. It is seen that this space or cutaway portion 303 is generally tubular in shape, forming a relatively tubular chamber. The portion 302 has an annular groove 304 extending therearound on the inside thereof at the right-hand end, FIG. 1. In the groove 304 there is disposed a ring or annular washer 305 of insulating material, which spaces the cylindrical electrode portion 269 from the adjacent wall of the portion 302 while permitting relative movement between the portion 302 and electrode portion 269. The ring or annular washer 305 has a plurality of cutaway portions at spaced intervals around the inner surface thereof, one of these cutaway portions being shown at 306. The spaces formed by the cutaway portions 306 uniformly admit the high pressure air to arc chamber 15, substantially equalizing the pressure between the front of the electrode 21 and the rear of the electrode. It is seen that the spaces 306 formed by the cutaway portions of washer 305 also communicates with a large passageway or conduit 308, which communicates with the bore through an air inlet device generally designated 309. The air inlet device 309 is composed of three sections, a first section 310 composed of metal or other material and having the bore therethrough communicating with the adjacent opening of the conduit 308 and having an O-ring seal 311 for providing sealing engagement with the adjacent wall portion of the rear chamber forming means 301. In threaded engagement with section 310 is a section 312 composed of electrically insulating material and having the O-ring 313 for providing a close sealing engagement between the sections. The third section 314 of the air inlet device 309 is composed of metal, if desired, is in threaded engagement with the center section 312 and has O-ring 315 for providing a close seal. Section 314 passes through an aperture 316 in the wall 11, and the air inlet device 309 is held in place in the aperture by collar 317 therearound, the collar 317 having bolts at spaced intervals therearound, two of these bolts being shown at 318 and 319 in threaded engagement with aligned threaded bores in the wall 11. It is seen that a portion 320 of the outside wall of cylindrical portion 302 assists in supporting the housing 120 of field coil 13, and that additional support is provided by a ring member 321 seated in a groove 322 and abutting against the housing 120. The rear chamber forming means generally designated 301 also has an annular shoulder 324 extending therearound in which is seated a cylindrical ring 325 of electrically insulating material having the other end thereof in an annular shoulder 326 in the tank end 19. The member 325, composed of electrically insulating material, firmly supports the rear chamber forming means while insulating it from the rear tank cover 19.

Oppositely disposed from the conduit 308 is a small passageway 328 communicating between the aforementioned space 303 back of the electrode 21, and an annular space 329 to assist in equalizing the pressure at 303 and 329.

As previously stated, the electrodes including the electrode generally designated 21 are insulated from the tank which contains the apparatus. It is necessary to insulate the electrode structure from the supporting cylindrical structure 300 even though electrode 21 and cylindrical structure 300 are at the same potential, to prevent the formation of parallel current paths which might cause sparking at 343 or at 341. To this end, a plurality of screws at spaced intervals in a circular pattern, two of these screws being shown at 331 and 332, have their threaded ends in threaded engagement with threaded bores 333 and 334 at spaced intervals around the axial extending cylindrical portion 300, pass through insulating bushings 335 and 336 and have their heads located in bores 337 and 338 which are considerably greater in diameter than the heads of the aforementioned bolts 331 and 332, and which provides for countersinking the heads of the bolts so that no electrical contact is made between the member 300 and the rear portion 340 of the electrode structure. It is seen that this rear portion 340 has annular grooves 341 extending therearound for limiting the flow of gas through this sliding joint as the cylinder portion 269 moves with respect thereto, and on the inside the rear portion 340 has an O-ring 342 in annular groove 343 for providing sealing engagement with the adjacent outer wall of a sleeve 360 as the electrode assembly including the sleeve moves with respect thereto.

In threaded engagement with the aforementioned threads 278 of the bushing member 277, there is the adjacent threaded end 361 of the long sleeve 360, the sleeve 360 having a portion of reduced outer diameter 362, and having at the other end a portion of increased outer diameter 363 with a threaded end 364. On the outside of the sleeve 360 and snugly engaging the same over a portion of its length, there is an outer sleeve 367 which has a flange portion 368 on the right-hand end thereof, FIG. 1B, the flange having an annular groove 369 therein in which is disposed an O-ring seal 370 for providing sealing engagement with the adjacent wall of cylindrical portion 300. Flange 368 has a tapered inner wall, as shown, against which snugly fits a tapered outer surface of sleeve 360. Spaced bores around the periphery of flange 368, two of these being shown at 371 and 372 communicate between annular space 348 and annular space 349 formed between sleeve 367 and sleeve portion of reduced diameter 362. The annular space 349 communicates at the other end with spaced holes 391 and 392. Holes 391 and 392 communicate with annular passageway 404, and also communicate by the spaces between contact fingers including 387 and 388 to chamber 413, thence by bores 409 to atmosphere.

Electrical current is supplied to the movable electrode 21 by way of an electrical terminal plate 373 composed of metal or other suitable material; the plate 373 is spaced from the tank end 19 by a cylindrical spacer member 374 having the right-hand end seated in a groove 375 in member 19. The electrical terminal plate 373 is firmly secured to the rear chamber forming means generally designated 301 by a plurality of elongated bolts passing through a plurality of bores at spaced intervals around a central bore or aperture 376. One of these elongated bolts is shown at 377 passing through a bore 378 in the electrical terminal plate member 373 and having a portion of reduced diameter 379 with an insulating sleeve or insulating flanged bushing 380 therearound and having the threaded end of the bolt in threaded engagement with a nut 381. The right-hand end of the bolt 377 may be threaded and is attached by threaded engagement to the rear chamber forming means 301. Accordingly, the electrical contact member 373 is insulated from bolts 377 and chamber forming means 301 by the insulating bushings or insulating sleeves 380. Secured to the electrical terminal plate 373 is a contact member 382 having a flange portion 383 having a plurality of bores 384 at spaced intervals therearound and having bolts 385 passing through the bores with their threaded ends in engagement with aligned threaded bores 386 for securing the contact member 382 to the terminal plate 373. The contact member 382 includes a plurality of circumferentially spaced contact fingers, two of these being shown at 387 and 388.

Secured to the aforementioned electrical contact plate 373 is an insulating plate 393 having a plurality of slots 394 around the periphery thereof for receiving the aforementioned nuts 381 attached to the aforementioned bolts 377. The insulating plate 393 has a plurality of bores 395 at spaced intervals around the periphery thereof through which pass bolts 396 having their threaded ends in threaded engagement in adjacent bores 397 in the electrical contact plate 373. It is seen that the bolt 396 has the left-hand end thereof, FIG. 1, surrounded by a sleeve or a flanged bushing of insulating material 398. Mounted around a portion of the sleeve 363 and having a flange portion 399 at the right-hand end thereof and a flange portion 400 at the left-hand end thereof is a cylinder generally designated 401, in which is disposed a movable piston 254 as aforementioned, the piston 254 abutting against an insulating washer 437 between it and a flange portion 402 on the left-hand end of the sleeve 367. The flange portion 399 at the right-hand end of the cylinder 401 is seen to abut against the aforementioned insulating plate 393, and the flange 399 has a plurality of bores at spaced intervals around the periphery thereof, one of these bores being shown at 403, in which are located the aforementioned insulating bushings or sleeves 398 and the aforementioned bolts 396 for securing the flange 399 and the integral cylinder 401 to the insulating plate 393 and to the electrical contact member 373, while maintaining electrical insulation between the cylinder 401 and terminal member 373. Piston 254 is seen to have an annular groove 405 with an O-ring 406. In the aforementioned flange 399, there is a passageway or conduit 407 connected with the threaded conduit end 252.

As previously stated, water for cooling the movable electrode, flowing in the coupling 250 and down the passageway 288, forces the movable electrode 21 to the right until it comes into contact with the fixed electrode 22. When electrode 21 moves to the right, it carries with it piston 254, for, as shown, piston 254 is clamped between flange 402 on sleeve 367 which abuts against the tapered portion of sleeve 360, and the threaded end 443 of sleeve 441 which is threaded to threaded end 364 of sleeve 360. Sleeve 360 as aforementioned is threaded to bushing 277 which is part of electrode 21. After contact is made between electrodes 21 and 22, it is necessary to move the movable contact 21 to the left again and to lengthen the arc path to provide dimensions which provide for optimum heating of the gas in the chamber. To provide for movement of the movable electrode away from the fixed electrode 22, that is to the left in FIG. 1, air is supplied to the chamber 253 formed by the aforementioned cylinder 401, and this air, pressing against the piston 254, causes the piston to move to the left, FIG. 1A, carrying with it the sleeves 367 and 360. As aforementioned, sleeve 360 is secured to the movable electrode 21.

A water header generally designated 410 has a flange portion 411 having a plurality of circular bores at spaced intervals around the periphery thereof, one of these bores being shown at 412. The bores 412 in flange portion 411 are aligned with a plurality of bores 414 in the aforementioned flange portion 400 of the cylinder generally designated 401. A plurality of spacer bars extend from the flange 411 to the flange 400, one of these bars being shown at 415, having nuts 416 and 417 adjustable as to their position on the threaded ends of the spacer bar 415 to precisely space the header and the cylinder, and having additional nuts 418 and 419 for securely fastening the spacer bar in place. The water header generally designated 410 is shown to have at the right-hand end thereof an additional flange portion 420, the outer annular surface of which fits snugly against the inner wall of the aforementioned cylinder 401. The flange portion 420 has an annular groove 421 therearound on the side thereof adjacent the piston 254, for containing a rubber gasket 456 to take up the shock of piston 254, and the flange portion 420 also has an additional cutaway portion around the periphery thereof on the same side to form an additional annular groove 422. In addition, flange portion 420 has a circular bore 423 passing therethrough in which is disposed one end of a push rod 424 having the other end thereof extending through a bore 425 in the aforementioned flange portion 411. The push rod 424 is seen to have a circular flange 426 thereon and to be biased in the right-hand direction by spring 427. The left-hand end of the push rod 424 is seen to be connected at 428 to the end of a lever 429 which is pivoted for rotation about a pin 430 mounted on a stud 431 extending from a microswitch generally designated 432. The microswitch 432 is secured to the aforementioned flange portion 411 by a bolt 433 passing through a threaded bore 434 in the flange. The other end of the lever 429 has a pin 435 thereon for engaging a contact arm 436 of the microswitch to operate the switch when the lever 429 is provided in a counterclockwise direction about the pin 430. This occurs when the piston 254 is forced to the left in cylinder 401 and to the position shown by pressure of air admitted through input 252. It is seen that the right-hand end of the push rod 424 abuts against the piston 254 in the position shown. Accordingly, the microswitch 432 is operated when the movable electrode 21 is returned to the left substantially as far as it will go, and the microswitch may be utilized in any convenient manner for one or more of a number of control purposes including cutting off the air supplied to inlet 252, and if desired turning on or off other inputs to the arc chamber.

The water header generally designated 410 is also seen to have disposed therein the aforementioned sleeve member 438 having an annular groove 439 with O-ring seal 440 at the left-hand end thereof, to have a central portion of somewhat reduced diameter 441 leaving a space 442 between the outer wall of the sleeve member 438 and the inner wall of the water header, and to have at the right-hand end thereof the portion of increased diameter 443. As aforementioned, the portion of increased diameter 443 is seen to abut against the piston 254 and the sleeve portion of increased diameter 443 is seen to have aforementioned internal threads engaging the threaded end 364 of the sleeve portion 363. This clamps the piston 254 in the position shown.

The water header 410 has a chamber 445 communicating with the aforementioned hydraulic insulator 251. Disposed inside of the aforementioned sleeve member 438 is an additional sleeve member 447 spaced therefrom to provide the annular passageway 448. The sleeve 447 extends through a bore 449 in the end of the header 410, with an O-ring seal 450 provided as shown, and thence the sleeve 447 is coupled by way of the elbow 451 to the aforementioned hydraulic input insulator 250. Inside of the aforementioned sleeve 447 in slidable engagement therein is the left-hand end of an elongated sleeve member 453 which has the right-hand end thereof threaded at 454 to make threaded engagement with the aforementioned internally threaded end of the coupling member 282 of electrode 21.

The aforementioned structure provides inlet and outlet passageways for the flow of cooling water to the electrode 21 and the flow of heated water therefrom. The passage of water to and from the electrode 21 may be traced as follows: water is supplied through the insulating terminal 250, elbow 451, thence through the sleeve 453 and down passageway 288, thence through the aforementioned apertures or openings 283 and 279, where the water divides, a portion of the water flowing into conduit 287 and thence around the spiral cooling channel 266, and a portion of the water which passes through openings 283 and 279 flowing through conduit 296 to the cooling coil 295. From these, water flows back through exit conduits, one of these being shown at 290, through the opening or passageway 280, through the partly annular space 285, and through the annular passageway 291 to the water header 410, where the water flows through the annular passageway 448 to the outlet chamber 445, and thence out through the outlet hydraulic insulator 251.

The tank structure including the end covers and the cylindrical wall portion is insulated from both electrodes. Although water header 410 is at the potential of one electrode, it does not provide a current path.

Particular reference is made now to FIGS. 2A and 2B, which when taken together show a second embodiment of my invention. The movable electrode generally designated 521 has a spiral passageway or passageways 527 therein, passageway 527 communicating with a main fluid flow passageway 588 by way of a conduit 528. The electrode 521 has an annular flange portion or lip portion 529 which also has a fluid passageway 530 therein. Electrode 521 is seen to have a cylindrical portion 532 extending therefrom to the rear, cylindrical portion 532 moving in a generally cylindrical space 533 which is provided for bringing gas into the chamber. This gas comes in through the gas inlet 534. Thence the gas flows through the space 535 and 536 and into the chamber.

Two elongated sleeves or tubes are secured to electrode 521 to move therewith; one of these tubes is designated 538 and is seen to extend into a bushing portion 539 of electrode 521 and to be secured in place therein as by threading or welding. The tube 538 forms the aforementioned central passageway 588 through which a cooling fluid is brought from fluid inlet hydraulic insulator 550 to the cooling passageways of the electrode. It is seen that the aforementioned bushing member 539 is shaped to form an annular passageway 540 which serves as a fluid outlet after fluid has passed through the cooling passageways of the electrode, the passageway 540 being connected with the spiral passageways by way of conduit 541.

The electrode when in the position shown is seen to be closely adjacent a generally annular supporting ring member 543 which is secured by bolts including 544 and 545 to an extended cylindrical portion of the frame, this portion being designated 547.

Threadedly secured to the electrode to move therewith is a short sleeve 558 having the left-hand end thereof as seen in the figure in threaded engagement with a sleeve extension 559, the sleeve 558 and the sleeve extension 559 being of the same inside diameter and spaced from the outer wall of the aforementioned sleeve 538 to form a fluid passageway 561 which communicates at the electrode with the aforementioned fluid passageway 540, the cooling fluid flowing down the cylindrical passageway 561 into an adjoining passageway 564 into an outlet chamber 566 and thence through hydraulic insulator 551 to a water outlet circuit, not shown.

The aforementioned tube extension 559 or sleeve extension is seen making contact with a plurality of spring fingers disposed at spaced intervals around the periphery thereof, two of these fingers being shown at 687 and 688, the tube 559 and the sleeve 558 forming part of the electrical circuit for bringing current to the electrode 521 to sustain the arc 220 therefrom. The aforementioned contact fingers 687 and 688 are seen to be secured to a flange portion 571 composed of conductive material and held to an electrical terminal plate 573 by peripherally spaced bolts 575. Adjacent the electrical terminal plate 573 is a plate 577 composed of electrically insulating material provided to electrically isolate the current path from the additional portion of the movable electrode structure, the various bolts and other adjoining parts being embedded in insulating bushings as shown to insure that no electrical path is provided.

As previously stated, one of the tubes connected to the electrode to move therewith has a piston secured thereto. This is the tube or tube extension 559 which has threaded thereto at threads 580 a piston 554. Piston 554 is seen to be disposed in a cylindrical chamber generally designated 553, having a cylindrical wall portion 582 and having a plate portion 584 forming the right-hand end thereof, the plate portion 584 being held in position by the aforementioned screw assembly of the electrical terminal plate 573 and the insulating plate 577, one of the bolts holding the end plate 584 in position being shown at 585. The aforementioned cylindrical passageway 561 extends to the end of the threaded portion 580 as shown, where it adjoins the cylindrical passageway 564. In order that the continuity of the passageway may not be broken when the electrode extends or moves to the right to make contact with the fixed electrode, not shown, a sliding sleeve arrangement is provided, one of these sleeves being shown at 591 and secured to or formed integrally with the piston 554; sleeve 591 slides with respect to an adjacent sleeve external thereto designated 592, the sleeve 592 being secured to or formed integrally with an end supporting plate member 593 which is connected by spacer rods 515 and 516 and other peripherally spaced spacer rods, not shown, with the means forming the aforementioned cylindrical wall portion 582 of the chamber 553 in which piston 554 moves.

To provide additional supporting forces, the aforementioned sleeve 592 has at the right-hand end thereof a flange portion 596 spaced from the piston 554 by annular resilient ring member 597, which also serves as a stop for the right-to-left movement of the piston; the annular wall of the flange portion 596 is in sliding engagement with a tubular member 599 secured to the piston 554 to move therewith by peripherally spaced bolts, one of these bolts being shown at 601.

As previously stated, the tube of smaller diameter of the concentric tube assembly, that is tube 538, is secured to electrode 521 to move therewith. The left-hand end of tube 538 is seen to be in sliding engagement within a tubular member 603 which is fixed in position by the supporting structure so that an unbroken fluid flow passageway is formed between passageway 588 and the aforementioned inlet hydraulic insulator 550.

In accordance with conventional practice, it is seen that a number of O-rings are provided within annular grooves wherever one part of the apparatus is in sliding engagement with another part of the apparatus, these O-rings being provided to insure fluid tight seals between the various sliding parts.

Additionally, it will be seen that apertures may be provided in various parts to permit the escape of air or other fluid from one passageway to another where this is desirable or necessary to prevent pressures from being built up within the structure.

Fluid trapped in the space which exists between members 591 and 592 while the electrode is in contact position escapes slowly through peripherally spaced bores including 701 and 702 when the electrode moves to the left, thereby limiting the velocity of movement.

Additionally, it is seen that the chamber 533 back of the electrode is joined by way of passageway 606 to a space 607 to permit constant pressures or balancing of forces on adjacent parts of the electrode, including part 609.

Chamber 703 is vented to atmosphere by passageway 704, also to assist in balancing forces caused by arc chamber pressure.

It is seen that the structure of the embodiment of FIGS. 2A and 2B is somewhat simpler than that of FIGS. 1A to 1C inclusive, in that only two concentric tubes are required to accomplish the same purpose. In summary, to move the electrode from the operating position shown to a contact position with a fixed electrode, not shown, to start the arc 220, fluid under pressure is brough into the inlet hydraulic insulator 550, flows down passageway 588 in tube 538 to the electrode, exerting pressure thereon and also flowing through the cooling passageways 527 at the electrodes, thence the fluid flows through the aforementioned passageway 540 and down the cylindrical passageway 561 between tube 538 and the aligned tubes 558 and 559; thence fluid flows through the aforementioned passageway 564, through outlet chamber 566 and out the outlet hydraulic insulator 551.

The electrical circuit is maintained as the contact fingers including fingers 687 and 688 have the aforementioned sleeve or tube 559 which is composed of conductive material move relative thereto. The tube 558 is conductive, and the structure of the electrode is conductive; it is not only composed of electrically conductive material but preferably of material such as copper which has a high thermal conductivity. As the electrode moves to the right in response to the pressure of the fluid in passageway 588, sleeve 538 slides with respect to sleeve 603, FIG. 2A. Piston 554 moves to the right within the cylinder wall 582, and sleeve 591 slides with respect to sleeve 592.

When the arc has been started and it is desired to move the electrode back to the operating position shown, air or other fluid under pressure is admitted to the chamber cylinder 553 through the inlet 552, exerting force against the piston 554 which is threaded to the sleeve extension 559, which is threaded to the sleeve 558 which is threaded or otherwise secured to the electrode to move therewith, and the piston 554 moves to the left carrying the electrode with it. Pressure may be maintained within the chamber 553 while the apparatus is in operation to insure that the pressure of fluid in passageway 588 does not cause the electrode to move out of the desired position.

In accordance with the other embodiment, a field coil 513 is provided near the electrode with ventilating passageways 512, for setting up a magnetic field to rotate the arc 220. The end plate 19 has the same structure and function as before.

To further summarize the advantages of my invention in both embodiments thereof, I have eliminated the necessity for a mechanically moved arc drawing mechanism to move up from the electrode 521 to the fixed electrode to start an arc, and to thereafter move back to a position where the arc 220 transfers itself from the arc drawing electrode or mechanism to the electrode 521. By utilizing the cooling fluid itself to provide the force necessary to move the electrode into contact position, I have obtained simplicity of operation, reliability of structure, and an arrangement of parts which may be easily electrically insulated from each other as required by the operation of the apparatus, as well as utilizing in large part sliding engagement between concentric tubes, which may be conveniently sealed by the use of the aforementioned O-rings in the annular grooves.

As before, bolts 524 serve to clamp the end plates 17 and 19 of the arc chamber together and maintain the parts in position therein.

The length of the arc can be adjusted externally by changing the length of the spacer bars 515 and 516.

Certain other details of the structure of the embodiment of FIGS. 2A and 2B, not described in great detail, will be apparent from the similarity of the structure to that shown in FIGS. 1A to 1C inclusive.

Preferably the field coils are fluid cooled, a fluid passageway and power connection to coil 513 being provided by 705, electrically insulated from the supporting structure by sleeve 706.

Whereas I have shown and described my invention with respect to some embodiments thereof which give satisfactory results, it should be understood that changes may be made and equivalents substituted without departing from the spirit and scope of my invention.

I claim as my invention:

1. Movable electrode apparatus for an arc heater having an arc chamber, at least one fixed electrode therein, and a gas inlet extending thereinto for bringing gas to be heated into the arc chamber at a predetermined position, comprising in combination, a movable electrode movably mounted in the arc heater at an axial position therein intermediate the point of gas entry and the fixed electrode and normally forming an arc space between electrodes, the movable electrode being adapted to be connected to a source of potential and including means forming a fluid cooled arcing surface with at least one fluid flow passageway therein for the flow of fluid to conduct heat away from the electrode, the movable electrode having at least two coaxially mounted tube means of different diameters secured to the arcing surface forming means, the tube means forming a passageway and an annular passageway both communicating with the passageway in the arcing surface forming means for bringing fluid to and from the arcing surface forming means, backwardly extending cylindrical means secured to the movable electrode, other cylindrical means in the arc heater spaced from the first-named cylindrical means and slidably supporting the movable electrode in position therein, gas to be heated entering the arc heater back of the first-named cylindrical means secured to the movable electrode and in the space between the first-named cylindrical means and the other cylindrical means, the first-named cylindrical means, other cylindrical means, and space therebetween tending to equalize gas pressure on the back and front of the movable electrode as the movable electrode moves toward the fixed electrode, and fluid operated piston means connected to one of the tube means and adapted when fluid pressure is applied thereto to move the movable electrode back to operating position.

2. Movable electrode apparatus according to claim 1 including third coaxial tube means connected to the movable electrode and adapted to bring current thereto to produce the arc.

3. Movable electrode apparatus according to claim 2 in which the third coaxial tube means is spaced from the nearest adjacent other coaxial tube means to form an additional annular passageway, said additional annular passageway at the end thereof remote from the arcing surface forming means being vented to atmosphere, said third coaxial tube means having the portion thereof near the arcing surface forming means spaced from the inner wall of the other cylindrical means which supports the movable electrode to form an air space, the other cylindrical means including means forming slidable hermetical sealing engagement with the outer surface of the last-named portion of the third coaxial tube means, said means forming a sealing engagement being adjacent the arcing surface forming means, the third coaxial tube means having means forming an annular flange, the annular flange having means providing slidable hermetical sealing engagement with the inner wall of the other cylindrical means, the flange having a plurality of peripherally spaced bores therein communicating between the air space and the additional annular passageway, air in the air space being slowly forced through the spaced bores into the additional annular passageway and thence to atmosphere as the movable electrode moves from an operating position to a contact position thereby insuring that the rate of motion of the movable electrode in response to fluid pressure does not exceed a predetermined value.

4. Movable electrode apparatus according to claim 2 including in addition spring contact fingers secured to the arc heater and electrically insulated therefrom, the spring contact fingers making sliding engagement with the external surface of the third coaxial tube means, the spring contact fingers being adapted to be electrically connected to a source of potential, current to produce the arc flowing through the contact fingers and thence through the third coaxial tube means to the arcing surface.

5. Movable electrode apparatus according to claim 1 including fluid inlet means having a tubular extension, the adjacent end of the innermost of the two coaxial tube means extending into said tubular extension in sliding engagement therein, the annular passageway which conducts fluid from the arcing surface forming means extending to a position substantially adjacent the end of the tubular extension while the movable electrode is in the operating position, and a sleeve mounted around the outside surface of the tubular extension and spaced therefrom to form a further annular passageway, outlet means communicating with said further annular passageway, said last-named passageway being substantially increased in width when the movable electrode is moved to the contact position thereby increasing the volume of fluid therein, fluid being trapped in the last-named passageway as the movable electrode begins to move back to the operating position, said larger volume of fluid being forced to flow through the further annular passageway thereby retarding the rate of motion of the movable electrode as it returns to operating position.

6. Movable electrode apparatus according to claim 1 wherein the fluid operated piston means includes means forming a cylinder enclosing an axial portion of the two coaxial tube means, a piston disposed in the cylinder secured to the outer tube means, the piston being moved with the movable electrode as it moves to a contact position, the cylinder being adapted to have gas under pressure forced thereinto to thereafter move the movable electrode back to the operating position.

7. Movable electrode apparatus for an arc heater having an arc chamber and at least one fixed electrode therein, comprising in combination, a movable electrode movably mounted in said arc chamber, the movable electrode being movable from a normal operating position spaced from the fixed electrode to a contact position wherein electrical contact is established between the movable electrode and the fixed electrode, means for establishing a potential difference between the movable electrode and the fixed electrode, fluid means operatively connected to the movable electrode for moving the movable electrode into contact with the fixed electrode to start an arc, means for retarding the rate of movement of the movable electrode as it moves from the operating position to the contact position to thereby insure that the rate of movement does no exceed a predetermined value, other fluid means operatively connected to the movable electrode for moving the movable electrode away from the fixed electrode to said operating position after the arc is started, and fluid trapping means utilizing a portion of the fluid employed by first-named fluid means for retarding the rate of movement of the movable electrode back to the operating position to thereby insure that the rate of movement back to the operating position does not exceed a predetermined value.

8. Movable electrode apparatus according to claim 7 wherein the retarding means includes means forming an air chamber which decreases in volume as the movable electrode moves toward the contact position, the means forming the air chamber having means for exhausting air therefrom at a slow rate to retard the rate of movement of the electrode.

9. Movable electrode apparatus according to claim 7 in which the movable electrode includes fluid cooled arcing surface forming means with a fluid passageway therein near the arcing surface for conducting heat therefrom, in which the first-named fluid means includes means secured to the movable electrode and forming a first passageway for bringing cooling fluid to the arcing surface forming means and other means secured to the movable electrode and forming an annular passageway for conducting fluid from the arcing surface forming means, and fluid outlet means, the fluid trapping means including means forming a chamber of variable volume interposed between the last-named passageway and the fluid outlet mean, said volume increasing as the movable electrode is moved toward the contact position and decreasing as the movable electrode is moved toward the operating position.

10. Movable electrode apparatus according to claim 7 including means carried by the movable electrode and co-operating with the arc heater structure for equalizing the pressure back of the electrode with the gas pressure in the arc chamber as the electrode moves from an operating position to a contact position to thereby provide for a rate of movement substantially independent of variations in the gas pressure within the arc chamber.

11. Movable electrode apparatus for an arc heater having an arc chamber and having at least one fixed electrode therein, comprising in combination, a movable electrode movably mounted in said arc chamber, the movable electrode including means forming an arcing surface having a fluid flow passageway therethrough for the flow of cooling fluid to conduct heat away from the arcing surface and having first and second coaxially mounted tube means secured to the arcing surface forming means to move therewith, the second tube means being of greater inside diameter than the outside diameter of the first tube means to form an annular passageway, fluid inlet means communicating with the passageway through the first tube means for bringing cooling fluid to the arcing surface forming means, pressure of the cooling fluid tending to cause the movable electrode to move from an operating position to a contact position carrying the first and second tube means therewith, fluid being conducted from the arcing surface forming means through the annular passageway between the first and second tube means, means for establishing a potential difference between the movable electrode and the fixed electrode to produce and sustain an arc therebetween, means for controlling the rate of movement of the movable electrode in response to fluid pressure applied thereto through the passageway in the first tube means to limit the rate of movement from the operating position to the contact position to a predetermined value, piston means secured to the second tube means and adapted to be moved by fluid pressure to bring the movable electrode back to operating position, fluid outlet means, and means interposed between the fluid outlet means and the annular passageway for utilizing the flow of fluid from the arcing surface forming means to retard the rate of movement of the movable electrode back to the operating position.

12. Movable electrode apparatus according to claim 11 including means carried by the arcing surface forming means and cooperating with the arc chamber for equalizing the pressure back of the movable electrode with the pressure in the arc chamber to thereby render the rate of movement of the movable electrode substantially independent of changes in the gas pressure within the arc chamber.

References Cited

UNITED STATES PATENTS

| | | | |
|---|---|---|---|
| 1,895,699 | 1/1933 | Ziska | 314—61 |
| 2,964,611 | 12/1960 | Boretti | 219—89 X |

JAMES W. LAWRENCE, *Primary Examiner.*

P. C. DEMEO, *Assistant Examiner.*